US009645327B2

(12) United States Patent
Isenhour et al.

(10) Patent No.: US 9,645,327 B2
(45) Date of Patent: May 9, 2017

(54) SIDE-FACET COUPLER HAVING EXTERNAL MOUNTING SURFACE MOLDED TO FACILITATE ALIGNMENT OF OPTICAL CONNECTIONS

(71) Applicant: CORNING OPTICAL COMMUNICATIONS LLC, Hickory, NC (US)

(72) Inventors: Micah Colen Isenhour, Lincolnton, NC (US); James Phillip Luther, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 424 days.

(21) Appl. No.: 14/299,455

(22) Filed: Jun. 9, 2014

(65) Prior Publication Data
US 2015/0355419 A1 Dec. 10, 2015

(51) Int. Cl.
*B29D 11/00* (2006.01)
*G02B 6/00* (2006.01)
*G02B 6/38* (2006.01)

(52) U.S. Cl.
CPC ........ *G02B 6/3883* (2013.01); *B29D 11/0075* (2013.01); *G02B 6/3885* (2013.01); *G02B 6/3897* (2013.01)

(58) Field of Classification Search
CPC .. G02B 6/3883; G02B 6/3897; G02B 6/3885; B20D 11/0075
See application file for complete search history.

(56) References Cited

U.S. PATENT DOCUMENTS

| 5,400,423 A | 3/1995 | Chun et al. |
| 6,074,577 A * | 6/2000 | Katsura ................. B29C 33/44 264/1.25 |

(Continued)

FOREIGN PATENT DOCUMENTS

| EP | 0485196 | 12/1994 |
| EP | 1229365 | 8/2002 |

(Continued)

OTHER PUBLICATIONS

EP15170844.3 Search Report Dated Nov. 17, 2015.

*Primary Examiner* — Mathieu Vargot (57) ABSTRACT

A molded waveguide side-facet coupler to facilitate an optical connection between optical side-facets and a fiber optic connector is disclosed. Instead of molding the side-facet coupler with the external mounting surface disposed on an external surface of the mold, the mold for the side-facet coupler is provided such that the mounting surface of the side-facet coupler is provided as a molded internal recess surface. The moldable material for the side-facet coupler is disposed around a recess core that is part of the mold, thereby forming a unitary component having at least one internal recess surface for providing an external mounting surface for the side-facet coupler. As the molded material cures around the core structure, the external surfaces of the unitary component pull away from internal surfaces of the mold, and shrink around the core structure. Thus, the internal recess surface of the unitary component is formed within narrower, repeatable tolerances.

21 Claims, 11 Drawing Sheets

(56) References Cited

U.S. PATENT DOCUMENTS

| | | | |
|---|---|---|---|
| 6,340,247 B1* | 1/2002 | Sakurai | G02B 6/3885 385/60 |
| 2013/0209112 A1 | 8/2013 | Witzens | |
| 2013/0230274 A1 | 9/2013 | Fish | 385/14 |

FOREIGN PATENT DOCUMENTS

| | | |
|---|---|---|
| WO | 2012017318 | 2/2012 |
| WO | 2015020870 | 2/2015 |

* cited by examiner

SIDE-FACET COUPLER HAVING EXTERNAL MOUNTING SURFACE MOLDED TO FACILITATE ALIGNMENT OF OPTICAL CONNECTIONS

BACKGROUND

The disclosure relates generally to side-facet couplers having external mounting surfaces molded as an internal recess surface to facilitate alignment of optical connections to optical side-facets of a waveguide.

Optical waveguide devices formed on planar substrates have become important elements for various optical network applications. These optical network applications include multiplexers and demultiplexers in dense wavelength division multiplexing (DWDM) systems, as well as components in passive optical networks (PON).

Figure 1:
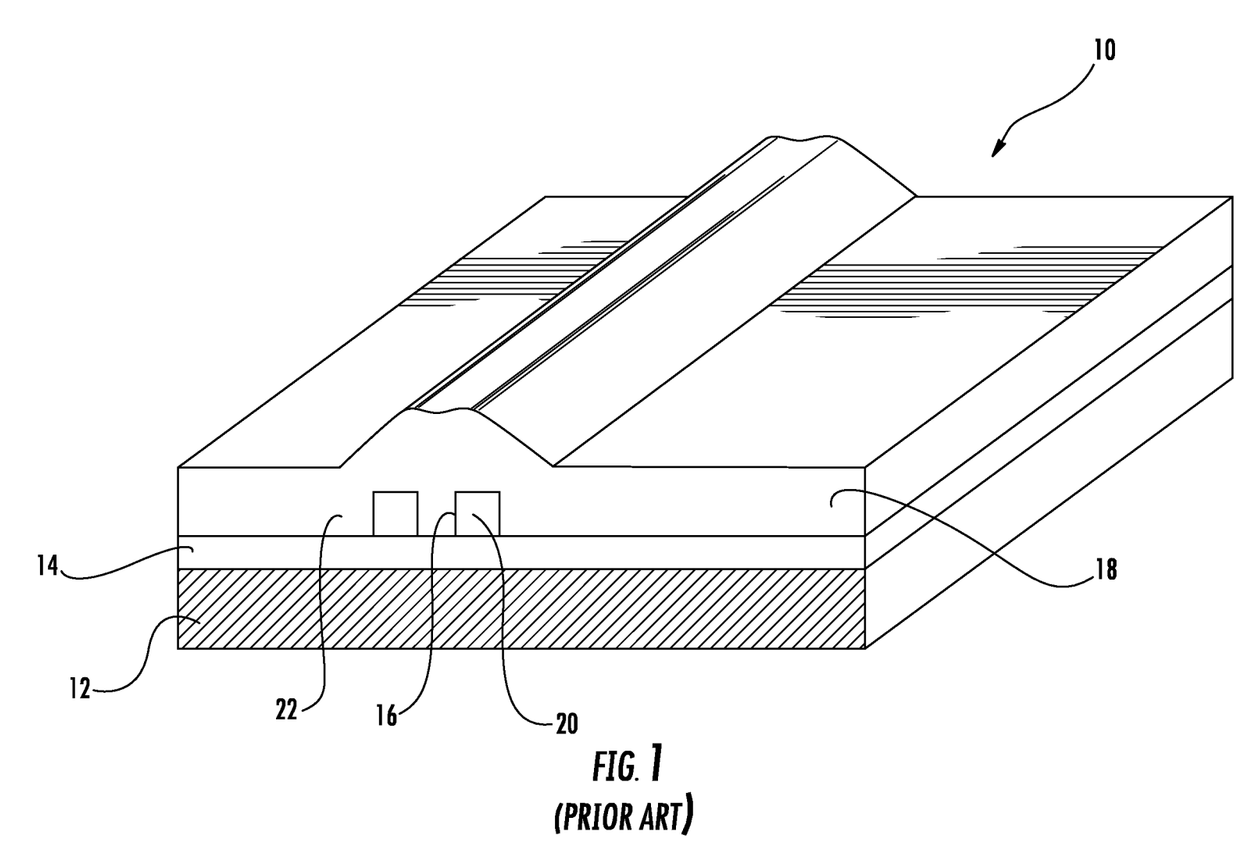
FIG. 1 illustrates an exemplary waveguide board assembly having a waveguide with a plurality of fiber optic connecters connected thereto.

In this regard, FIG. 1 is a cross-sectional view of an optical waveguide board assembly 10 formed on a planar substrate 12. On the planar substrate 12, there are a lower cladding layer 14, a core layer 16, and an upper cladding layer 18. These layers may be made of pure silicon or silicon dioxide ($SiO_2$). Light travels through the core layer 16. Optical signals are received from and provided by the waveguide board assembly 10 via facets 20 of the core layer 16. In this example, facets 20 are side-facets formed in a side surface 22 of the waveguide board assembly 10, thereby providing optical connectivity for the waveguide board assembly 10 via the side surface 22. However, optically connecting a fiber optic connector to the side-facets 20 may be difficult, because a distance between an external connection surface and internal connection features of a coupler (e.g., alignment bores) must be repeatably manufactured within prescribed tolerances. If the tolerances for these distances vary beyond these prescribed tolerances, the distances between the alignment features of a coupler edge-mounted to the waveguide board assembly 10 and the side-facets 20 of the waveguides may be inaccurate, causing a coupled fiber optic connector to be misaligned with the side-facets 20 of the waveguide board assembly 10. Connection misalignment may cause attenuation and/or signal loss of the fiber optic connections.

Many factors contribute to the difficulty in aligning external components with side-facet waveguides such as waveguide board assembly 10 in FIG. 1. For example, many commonly used silicon waveguides have a physical cross section of 200 nm×200 nm or smaller. The mode field diameter, i.e., distribution of irradiance across the face of the core layer 16, may also be three microns (3µ) or less. The numerical aperture (NA) of the waveguide, i.e., the range of angles over which the system can accept or emit light, may also be very different from the NA of the optical fibers being coupled to the waveguide. These and other properties all contribute to the need for highly accurate alignment mechanisms having high mechanical stability over a wide range of temperatures.

No admission is made that any reference cited herein constitutes prior art. Applicant expressly reserves the right to challenge the accuracy and pertinency of any cited documents.

SUMMARY

Embodiments disclosed herein include a side-facet coupler having an external mounting surface molded as an internal recess surface to facilitate alignment of optical connections to optical side-facets of a waveguide. Related components, systems and methods are also disclosed. As a non-limiting example, the side-facet coupler may be edge-mounted on a waveguide substrate to provide a ferrule-like structure for receiving a fiber optic connector and optically aligning the ferrule of the fiber optic connector to the side-facet(s) of the waveguide. The side-facet coupler is formed from a moldable material that includes a mounting surface to allow the side-facet coupler to be mounted on a mounting surface of a substrate adjacent to side-facets. In this manner, the side-facet coupler provides a known distance between the mounting surface and an alignment feature (e.g., an alignment bore or hole) provided in the side-facet coupler to facilitate optical alignment to the side-facets.

Instead of molding the side-facet coupler with the external mounting surface disposed on an external surface of the mold, the mold for the side-facet coupler is provided such that the mounting surface of the side-facet coupler is provided as a molded internal recess surface. In this regard, the moldable material for the side-facet coupler is disposed around a recess core that is part of the mold, thereby forming a unitary component having at least one internal recess surface for providing an external mounting surface for the side-facet coupler. As the molded material cures around the core structure, the external surfaces of the unitary component pull away from the internal surfaces of the mold, and shrink around the core structure. Thus, the internal recess surface of the unitary component is formed within more accurate, repeatable tolerances due to the mold providing the external mounting surface of the side-facet coupler as an internal recess surface of the unitary component, rather than as an external component surface. After the unitary component is formed, a portion of the moldable material is then removed from the unitary component such that a remaining portion of the moldable material of the unitary component forms at least one side-facet coupler.

Thus, as a non-limiting example, when the external mounting surface of the side-facet coupler is actively aligned and mounted on a mounting surface of a waveguide assembly, the distances between the internal features of the side-facet coupler and the waveguides facets disposed in the waveguide assembly are known to be within a desired tolerance. As a result, when a fiber optic connector is inserted into the side-facet coupler, the fiber optic connector will more accurately align with the side-facets of the waveguide during assembly.

One embodiment of the disclosure relates to a method of forming a side-facet coupler for receiving a connection feature of an edge-mount fiber optic connector. The method comprises disposing a moldable material in a side-facet coupler mold such that the moldable material is disposed around at least one core structure, thereby forming a unitary component having one or more connection features and one or more recesses each having at least one internal recess surface. The method further comprises removing a portion of the moldable material from the unitary component such that a remaining portion of the moldable material of the unitary component forms one or more side-facet couplers. Each side-facet coupler has at least one of the one or more connection features for receiving a complementary connection feature of a fiber optic connector. Each side-facet coupler also has at least one external mounting surface formed from a portion of the at least one internal recess surface of the one or more recesses of the unitary component. The at least one external mounting surface is configured to attach to a surface of a waveguide assembly for optically aligning one or more optical fibers in a fiber optic connector with a waveguide disposed in the waveguide assembly when the connection feature of the fiber optic connector is connected to the at least one of the one or more connection features of the side-facet coupler.

An additional embodiment of the disclosure relates to a unitary component for forming a coupler configured to align a fiber optic connector with a waveguide disposed in an integrated circuit. The unitary component comprises at least two portions connected to each other to form at least one recess in the unitary component defining an internal recess surface. At least one of the at least two portions comprises a coupler portion having at least one external mounting surface formed from a portion of the internal recess surface. In addition, when the coupler portion is removed from the other portions of the unitary component, the at least one external mounting surface is configured to be attached to a surface of a waveguide assembly in order to align a fiber optic connector with the waveguide of the waveguide assembly.

An additional embodiment of the disclosure relates to a mold for a unitary component for forming a coupler configured to align a fiber optic connector with a waveguide disposed in an integrated circuit. The mold comprises at least one inner-facing wall defining at least one outer surface of the unitary component. The mold further comprises at least one alignment feature core defining at least one alignment feature of the unitary component. The mold further comprises at least one recess core defining at least one recess in the unitary component having an internal recess surface. The mold is configured to form a unitary component. The unitary component comprises at least two portions connected to each other to form the at least one recess in the unitary component defining an internal recess surface. At least one of the at least two portions comprises a coupler portion having at least one external mounting surface formed from a portion of the internal recess surface. In addition, when the coupler portion is removed from the other portions of the unitary component, the at least one external mounting surface is configured to be attached to a surface of a waveguide assembly in order to align a fiber optic connector with at least one waveguide of the waveguide assembly.

An additional embodiment of the disclosure relates to a rotatable clip for securing a fiber optic connector to a fiber optic coupler. The rotatable clip comprises a clip body configured to be attached to a fiber optic connector. The rotatable clip further comprises an arm rotatable about the clip body configured to extend over the fiber optic coupler when the fiber optic connector is coupled to the fiber optic coupler. The rotatable clip further comprises a biasing member extending from the arm and configured to engage the fiber optic coupler when the arm is rotated about the clip body such that the clip body is biased toward the fiber optic coupler, thereby biasing the fiber optic connector toward the fiber optic coupler to secure the fiber optic connector to the fiber optic coupler.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Various embodiments will be further clarified by the following examples. However, before describing the novel molding and formation process for the exemplary embodiment of FIG. 3 et al., an exemplary side-facet coupler mechanism formed using conventional molding techniques will be described in detail with respect to FIGS. 2A-2D. In particular, the exemplary components of FIGS. 2A-2D will illustrate the difficulties of molding components with high accuracy and suitability for use in optically aligning components with side-facet waveguides.

Figure 2A:
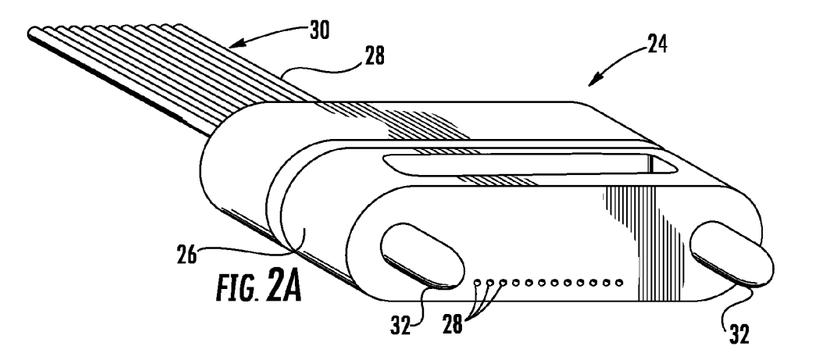
FIGS. 2A-2D illustrate views of a connection of a connector and coupler in which the optical fibers of the connector are configured to be optically connected to the side-facets of the waveguide of FIG. 1.
Figure 2B:
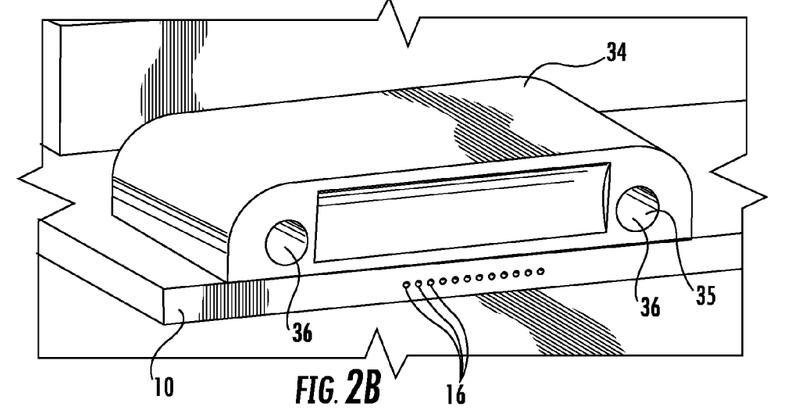

In this regard, FIGS. 2A and 2B illustrate views of exemplary components for optically connecting and aligning a connector 24 to a side-facet waveguide board assembly 10. A fiber optic connector 24 may include a ferrule 26 for receiving and retaining an optical fiber 28 of a fiber optic cable 30. Alignment features, such as pins 32, are provided to align the optical fibers 28 with a complementary coupler, such as the side-facet coupler 34 (also referred to herein as "coupler" or "side coupler") of FIG. 2B. In this regard, the side-facet coupler 34 may be mounted to the waveguide board assembly 10 such that alignment features, such as internal surfaces 35 defining alignment holes 36 configured to receive pins 32 of connector 24, align the optical fibers 28 of the connector 24 with the core layer 16 of the waveguide board assembly 10. In this embodiment, the coupler 34 uses an adhesive layer, represented by bond line 38, to mount the coupler 34 to the waveguide board assembly 10. However, couplers formed from molded material, such as thermoplastic or other plastics, are difficult to form within tolerances required for reliable alignment with waveguide assemblies, particularly with respect to external surfaces of the coupler. In addition, it is difficult to consistently form a bond line of uniform and consistent thickness.

Figure 2C:
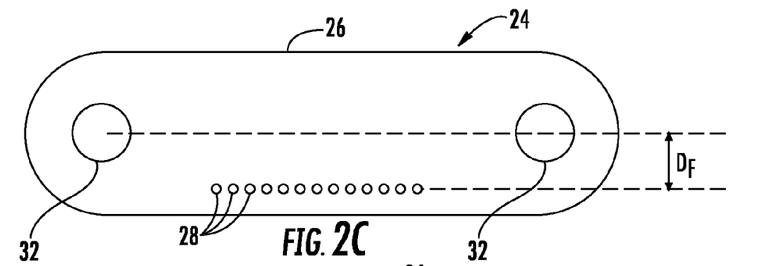
Figure 2D:
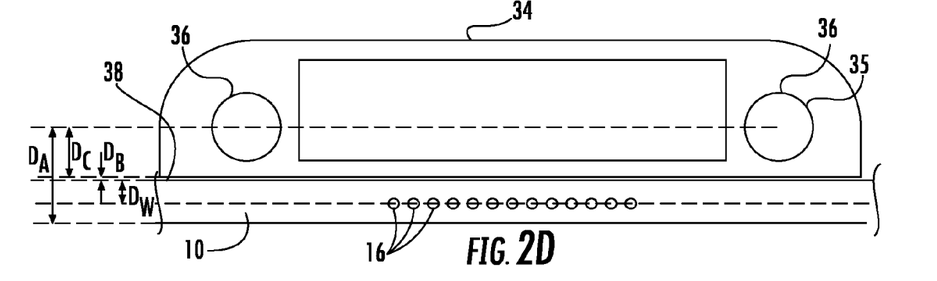

Referring now to FIGS. 2C and 2D, the ferrule 26 of connector 24 defines a vertical distance $D_F$ between the center axes of the optical fibers 28 and the center axes of alignment pins 32. For the optical fibers 28 to align with the core layer 16 of the waveguide board assembly 10, a vertical distance $D_A$ between the center of core layer 16 and the center axes of alignment holes 36 must also be substantially equal to $D_F$ in order to optically connect the optical fibers 28 to the waveguide board assembly 10. Vertical distance $D_A$ is defined as the sum of the vertical distance $D_C$ between the center axes of alignment holes 36 and an external connection surface of the coupler 34, the vertical thickness $D_B$ of bond line 38, and the vertical distance $D_W$ between an external connection surface of the waveguide board assembly 10 and the center of core layer 16.

As discussed above with respect to FIGS. 2A-2D, it is difficult to form the coupler 34 from a molded material in a way that reliably results in a consistent and accurate vertical distance $D_C$. Many factors contribute to these difficulties, including the relatively small physical cross section of silicon waveguides, the mode field diameter of the waveguide, and the differences in NA between different components. Applicant has recognized that one reason for this difficulty is that, as molded material cures within a mold, the external surfaces of a molded component shrink and pull away from internal surfaces of the mold. The variances in thickness caused by this pulling away from the internal surfaces of the mold is enough to result in inconsistent alignment of optical fibers in a ferrule with a waveguide when the ferrule is connected to a coupler connected to the waveguide.

Thus, it is difficult to repeatably provide a molded coupler component having a specified distance $D_A$ between an internal alignment feature and an external surface within a desired tolerance. As a result, when an external surface of the coupler is attached to other components, such as the upper cladding layer 18 of waveguide board assembly 10 of FIG. 1, the internal connection features 35 (alignment holes 36 in this embodiment) of the coupler are similarly difficult to align with other features of the attached components, such as the side-facets 20 of the waveguide board assembly 10. Thus, Applicant has recognized that the inaccuracy of conventional external molded surfaces contributes to the difficulties in accurately aligning the coupler and other components on waveguide assemblies.

In this regard, embodiments disclosed herein include a side-facet coupler having an external mounting surface molded as an internal recess surface to facilitate alignment of optical connections to optical side-facets of a waveguide. Related components, systems and methods are also disclosed. As a non-limiting example, the side-facet coupler may be edge-mounted on a waveguide substrate to provide a ferrule-like structure for receiving a fiber optic connector and optically aligning the ferrule of the fiber optic connector to the side-facet(s) of the waveguide. The side-facet coupler is formed from a moldable material that includes a mounting surface to allow the side-facet coupler to be mounted on a mounting surface of a substrate adjacent to side-facets. In this manner, the side-facet coupler provides a known distance between the mounting surface and an alignment feature (e.g., an alignment bore or hole) provided in the side-facet coupler to facilitate optical alignment to the side-facets.

Instead of molding the side-facet coupler with the external mounting surface disposed on an external surface of the mold, the mold for the side-facet coupler is provided such that the mounting surface of the side-facet coupler is provided as a molded internal recess surface. In this regard, the moldable material for the side-facet coupler is disposed around a recess core that is part of the mold, thereby forming a unitary component having at least one internal recess surface for providing an external mounting surface for the side-facet coupler. As the molded material cures around the core structure, the external surfaces of the unitary component pull away from the internal surfaces of the mold, and shrink around the core structure. Thus, the internal recess surface of the unitary component is formed within more accurate, repeatable tolerances due to the mold providing the external mounting surface of the side-facet coupler as an internal recess surface of the unitary component, rather than as an external component surface. After the unitary component is formed, a portion of the moldable material is then removed from the unitary component such that a remaining portion of the moldable material of the unitary component forms at least one side-facet coupler.

Thus, as a non-limiting example, when the external mounting surface of the side-facet coupler is actively aligned and mounted on a mounting surface of a waveguide assembly, the distances between the internal features of the side-facet coupler and the waveguide facets disposed in the waveguide assembly are known to be within a desired tolerance. As a result, when a fiber optic connector is inserted into the side-facet coupler, the fiber optic connector will more accurately align with the side-facets of the waveguide during assembly.

Figure 3:
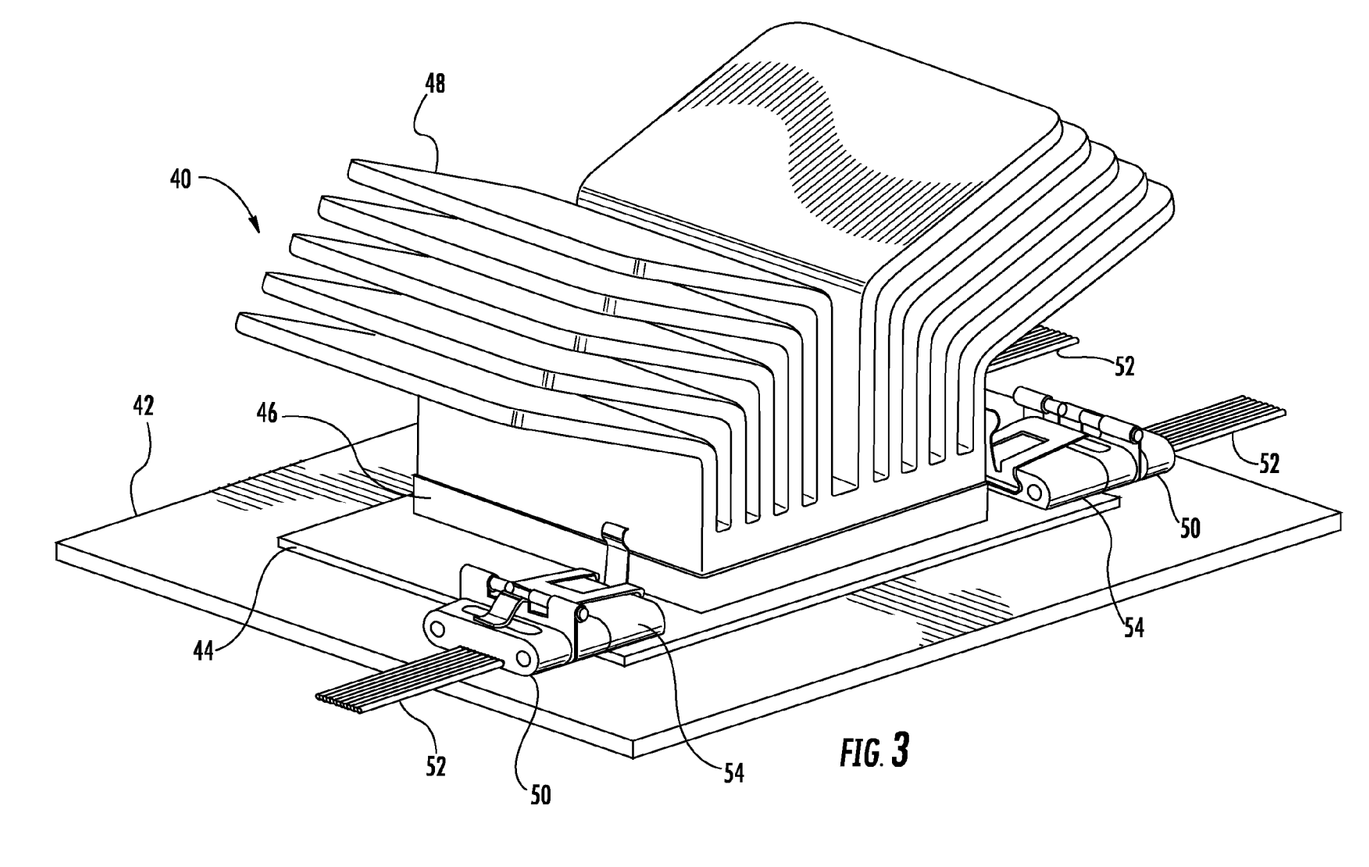
FIG. 3 illustrates a board assembly having a waveguide assembly with a plurality of side-facet-facing fiber optic connecters connected thereto, according to an exemplary embodiment.

In this regard, FIG. 3 illustrates a board assembly 40 according to an exemplary embodiment that employs these features, including molding external component features as internal components to increase component accuracy. The board assembly 40 includes a substrate 42 supporting a waveguide assembly 44. In this embodiment, a processor 46 is connected to the waveguide assembly 44 for communicating with the waveguide, and a heatsink 48 is connected to the processor 46 to dissipate heat produced by the processor 46. A plurality of fiber optic connectors 50 optically connects fiber optic cables 52 to the waveguide assembly 44. The connectors 50 are mated with ferrule-like side-facet couplers 54 connected to the waveguide assembly 44 (which may include an integrated circuit therein) for aligning the optical fibers of fiber optic cable 52 with the waveguide assembly 44. These side-facet couplers 54 are molded as part of a larger unitary component, described in detail below with respect to FIGS. 5-6C et al., according to an exemplary embodiment.

Figure 4A:
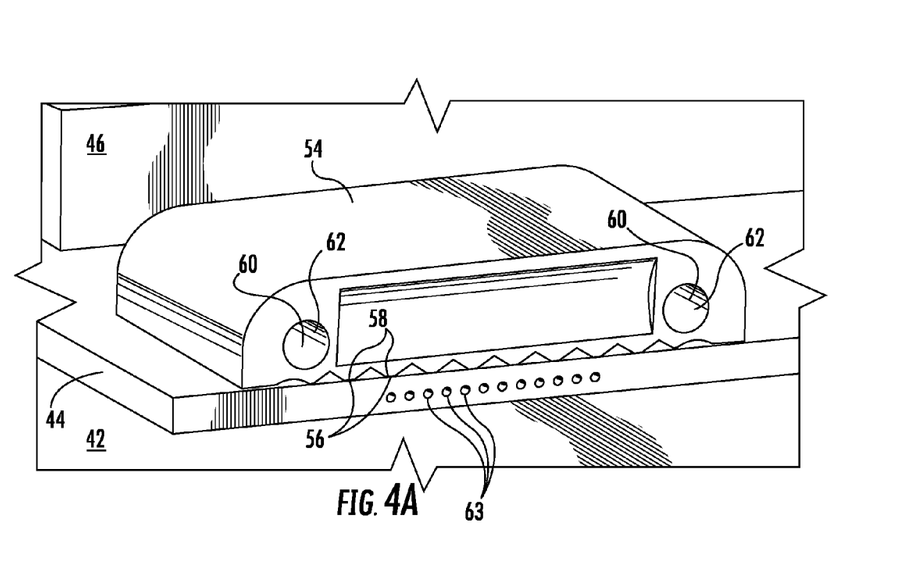
FIGS. 4A and 4B illustrate detailed views of the alignment features of the connector and ferrule of FIG. 3.
Figure 4B:
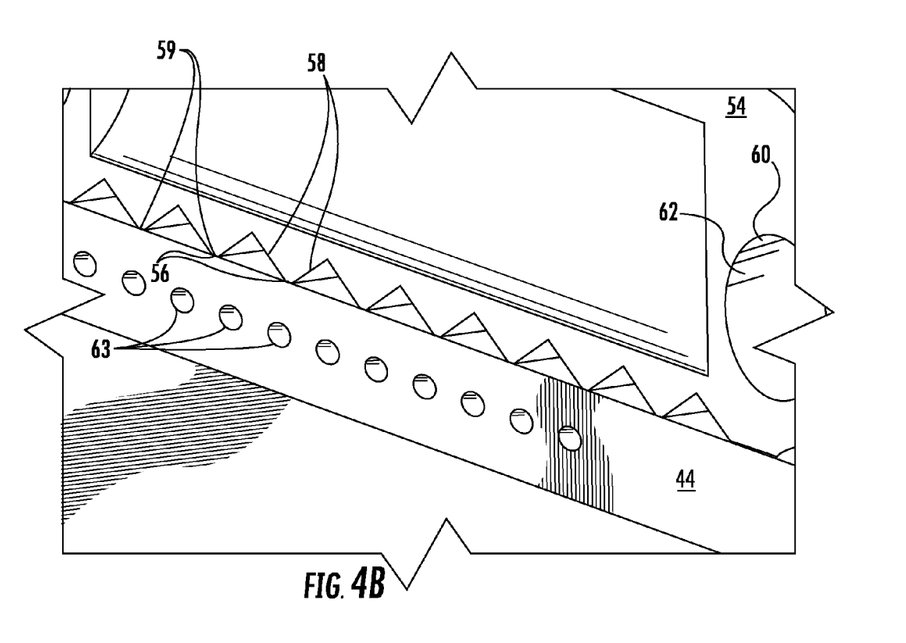

In this regard, FIGS. 4A and 4B illustrate detailed views of the alignment features of the side-facet coupler 54 of FIG. 3. In this embodiment, bond line 56 is designed to have a vertical thickness $D_B$ (shown below in FIG. 9C) that is as small as possible. One method of minimizing the vertical thickness $D_B$ of bond line 56 is to reduce the contact area of the mounting surface 58 of side-facet coupler 54. In this example, the mounting surface 58 has a sawtooth-shaped cross sectional profile, which provides a plurality of individual longitudinal contact surfaces 59 configured to bond with the surface of the waveguide assembly 44. This arrangement provides sufficient contact area for an adhesive (e.g., epoxy) while providing space for excess adhesive to flow, thereby contributing to minimizing the vertical thickness $D_B$ of bond line 56. In this manner, the total distance $D_A$ (shown below in FIG. 9C) can be more tightly controlled because vertical thickness $D_B$ of bond line 56 is minimized. Thus, in this example, for the vertical thickness $D_B$ of bond line 56 should be reduced to less than one micron (1µ), and may be less than five hundred nanometers (500 nm).

In many applications, the other components of vertical distance $D_A$ must be tightly controlled as well. Currently, the vertical distance $D_C$ between the center axes of connection features 60, i.e., alignment holes 62, and an external mounting surface 58 of the coupler 54 is difficult to achieve with conventional molding techniques. Although the vertical distance $D_W$ between an external connection surface of the waveguide assembly 44 and the centers of side-facets 63 of the waveguide assembly 44 is relatively easier to maintain within acceptable tolerances, the accuracy of vertical distance $D_W$ (shown below in FIG. 9C) is just as important to maintaining a consistent vertical distance $D_A$.

Thus, repeatably producing a consistent vertical distance $D_A$ requires that both waveguide assembly 44 and coupler 54 be accurately formed, in order to ensure that distances $D_C$ and $D_W$ are consistently within acceptable tolerances for optically connecting and aligning optical fibers. While conventional waveguide production techniques are capable of producing waveguides, such as waveguide assembly 44, with a consistently accurate vertical distance $D_W$, producing plastic components having acceptable tolerances remains difficult.

In these and other embodiments, the alignment holes 62 define a first connection plane, and the external mounting surface 58 defines a second connection plane offset from the first connection plane by a distance $D_C$. Likewise, the first connection plane is offset from a third connection plane defined by the center of side-facets 63 of the waveguide assembly 44 by a distance $D_A$.

Figure 5:
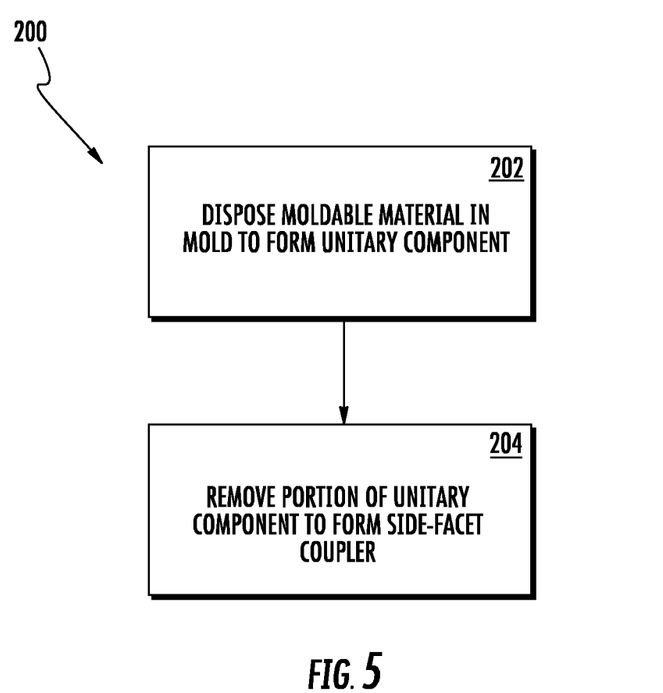
FIG. 5 is a flow chart of an exemplary process for forming a ferrule according to the embodiment of FIGS. 3-4B.
Figure 6A:
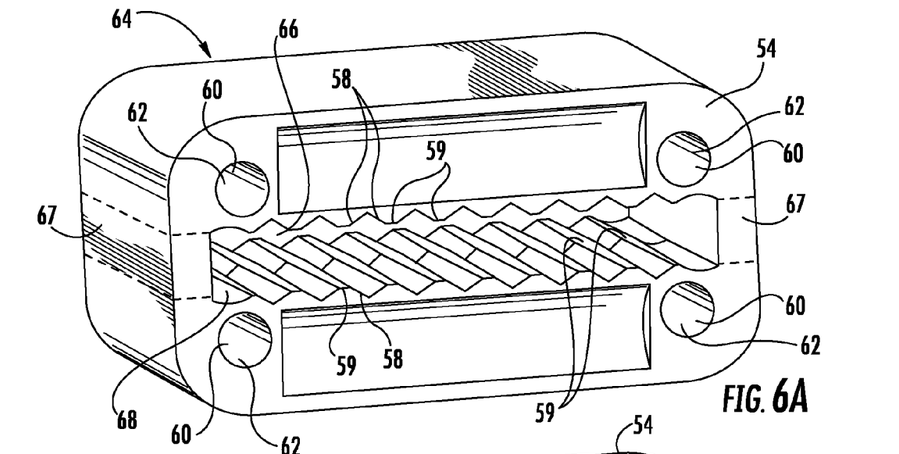
FIGS. 6A-6C illustrate an exemplary unitary component having two ferrule portions and the removal of excess portions to form two couplers having highly accurate external surfaces formed from internal surfaces of the unitary component.

In order to form a coupler 54 having acceptable tolerances for high accuracy applications, Applicant has recognized that molding an external mounting surface, such as external mounting surface 58, as an internal molded surface can increase the accuracy of the molded part. In this regard, FIG. 5 is a flow chart of an exemplary process 200 for forming a ferrule according to the embodiment of FIGS. 3-4B. When referring to process steps illustrated in FIG. 5, reference will be made to structural features shown in FIGS. 6A-6C as well. In this regard, a moldable material is disposed in a side-facet coupler mold such that the moldable material is disposed around at least one core structure (block 202). This disposing step includes molding a unitary component having an internal surface disposed around the core structure, in order to produce an external surface of a coupler with high accuracy. Referring now to FIG. 6A, this molding step forms a unitary component 64 having one or more alignment holes 62 and one or more recesses 66 each having at least one internal recess surface 68. Because the unitary component 64 has the internal recess surface 68 molded as an internal feature, the internal recess surface 68 has high accuracy.

Next, a portion 67 of the moldable material is removed from the unitary component 64 such that a remaining portion of the moldable material of the unitary component 64 forms one or more side-facet couplers 54 (block 204 of FIG. 5).

Figure 6B:
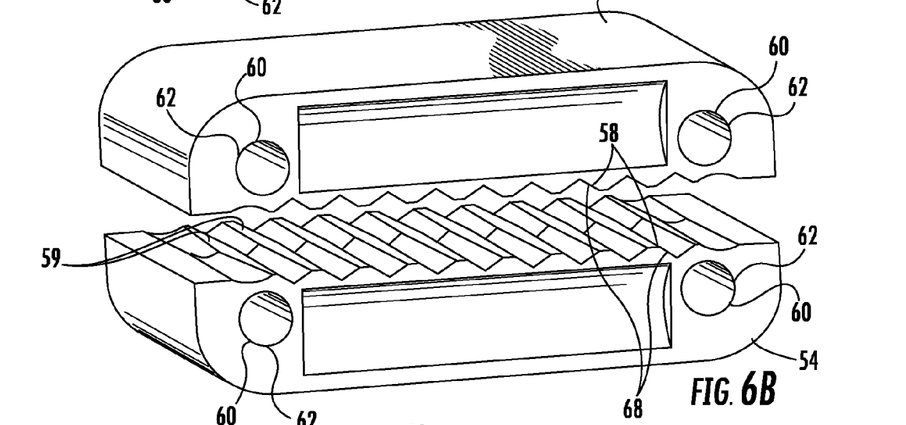
Figure 6C:
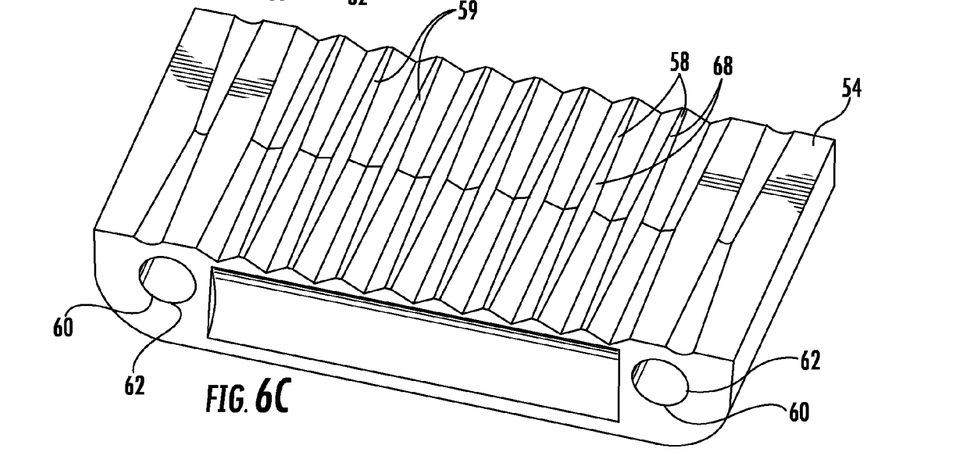

This removing step exposes the internal recess surface 68 as the external mounting surfaces 58 of the respective couplers 54. Referring now to FIGS. 6B and 6C, each coupler 54 has a pair of connection features 60, i.e., alignment holes 62, for receiving complementary connection features of fiber optic connector 50 (not shown). Each coupler 54 also has an external mounting surface 58 formed from a portion of the at least one internal recess surface 68 of the recess 66 of the unitary component 64. The external mounting surface 58 is configured to attach to a surface of waveguide assembly 44 (see FIG. 4A) for optically aligning the optical fibers in fiber optic connector 50 with the side-facets 63 of the waveguide assembly 44 (not shown) when the fiber optic connector 50 (not shown) is connected to the alignment holes 62 of the side-facet coupler 54.

Figure 7A:
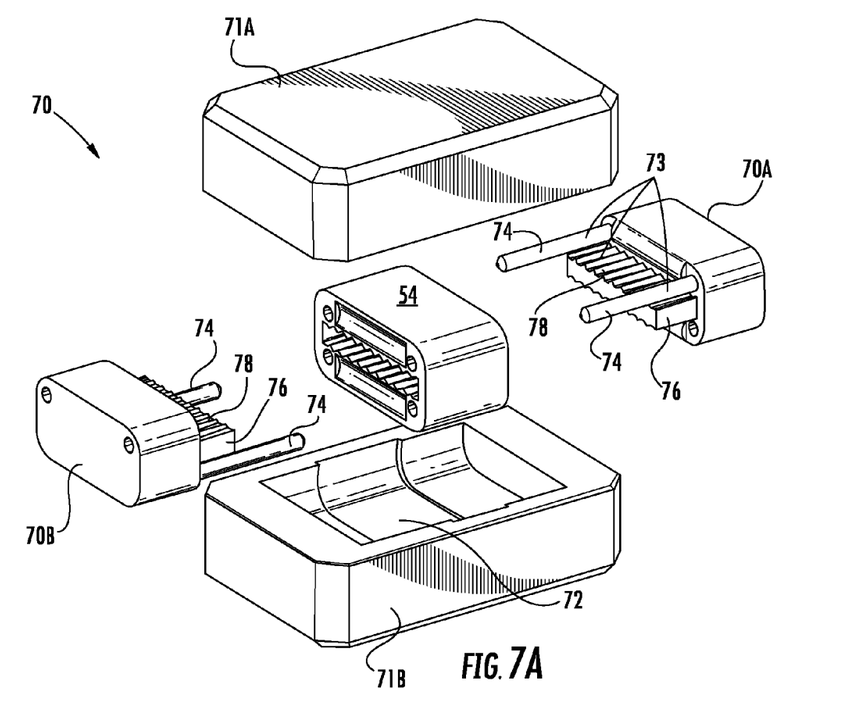
FIGS. 7A and 7B illustrate an exemplary mold configured to form the unitary component of FIGS. 6A-6C, including an internal recess surface configured to form an external mounting surface of the couplers.
Figure 7B:
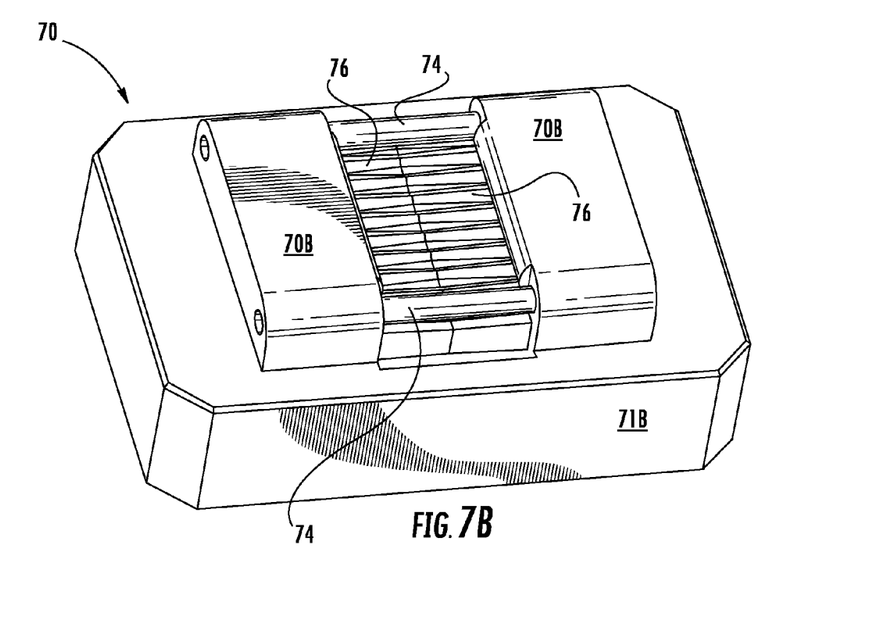

By molding the external mounting surface 58 of coupler 54 as an internal recess surface 68 of a molded unitary component 64, the external mounting surface may be formed with greater accuracy with respect to the alignment features, i.e., alignment holes 62, of the resultant coupler 54. In this regard, FIGS. 7A and 7B illustrate exemplary views of a side-facet coupler mold 70 having complementary internal mold halves 70A, 70B for forming the unitary component 64 of FIG. 6A. FIG. 7A is an exemplary exploded view of the mold 70 and molded unitary component 64. The mold 70 in this embodiment also includes two outer mold halves 71A, 71B to enclose the internal mold halves 70A, 70B and unitary component 64 during the molding process. Outer mold halves 71A, 71B of mold 70 comprise an internal surface 72 having an inner-facing wall for defining the unitary component 64, and include a plurality of core structures 73, including alignment hole-forming cores 74 in recess-forming core 76. Alignment hole-forming cores 74 define the alignment holes 62, and recess-forming cores 76 have an external core surface 78 for defining the internal recess surface 68 of recess 66 of the unitary component 64. Referring now to FIG. 7B, the assembled mold 70 is illustrated with the top outer mold half 71A removed to show the internal components of the mold 70. When moldable material is disposed in the mold 70 to form the unitary component 64, the internal surface 72 of the mold 70 defines an external component surface of the unitary component 64, while the external core surface 78 of the recess-forming core 76 defines the internal recess surface 68 of the unitary component 64.

In this manner, the mold 70 of FIGS. 7A and 7B is configured to form the unitary component 64 of FIG. 6A comprising two portions each corresponding to a coupler 54. Each coupler 54 thus has at least one external mounting surface 58 formed from a portion of the internal recess surface 68 defined by the recess-forming core 76 of the mold 70. The mold 70 is also similarly configured to define the alignment holes 62 of each coupler 54 via the alignment hole-forming cores 74 of the mold 70, such that the alignment holes 62 are configured to receive a connection feature of the fiber optic connector 50, for example.

The mold 70 also defines the first and second connection planes, described above with respect to FIGS. 4A and 4B. Just as the alignment holes 62 define a first connection plane, the alignment hole-forming cores 74 of mold 70 define a first connection plane for each of the couplers 54. Likewise, just as the external mounting surface 58 of coupler 54 defines a second connection plane offset from the first connection plane by a distance $D_C$, the external core surface 78 of the recess-forming core 76 also defines the second connection plane offset from the first connection plane. In this example, external mold surface of the recess core also includes a plurality of surfaces configured to form longitudinal contact surfaces 59 in the unitary component 64 for bonding the coupler 54 with the surface of the waveguide assembly 44, such as the external mounting surface 58 having a sawtooth-shaped cross sectional profile, described above with respect to FIGS. 4A and 4B.

Thus, as described above, it is apparent that the side-facet couplers 54 illustrated by FIGS. 3-6C have a number of non-limiting, exemplary advantages over traditional molding processes for couplers and other components. As noted above, by molding the external features of the coupler 54 as internal features of a larger component (described below with respect to FIGS. 5-6C), the accuracy of these external features may be increased, thereby making these features more suitable for high-accuracy applications such as aligning and optically connecting connector 50 with waveguide assembly 44, as shown in FIG. 3. After these features are molded as highly accurate internal features, these features can then be exposed by removing a portion of the larger component to form the finished coupler 54.

Another advantage of this arrangement is that it becomes possible to connect a ferrule having fibers laterally offset (i.e., eccentric) from the connection features of the connector to a side-facet waveguide assembly. Without an accurate connection mechanism offset from the plane of the waveguide assembly, it becomes difficult to accurately align a fiber optic connector having an eccentric ferrule configuration.

A further advantage of this arrangement is that the selection of materials for the coupler 54 is increased, because greater accuracy can be achieved with materials, such as thermoplastic and other plastics, that were previously considered to be unreliable for use with these and other high-accuracy applications. The embodiment of FIG. 3 is a non-reflow solution, in which separate components are bonded to each other without soldering, melting or otherwise applying high heat to the components. In other embodiments, such as reflow solutions in which high temperatures heat and/or melt surfaces together to more securely and permanently bond the components together, other materials may be used for the coupler, such as ground glass or etched silicon, along with a high temperature adhesive, for example.

Figure 8A:
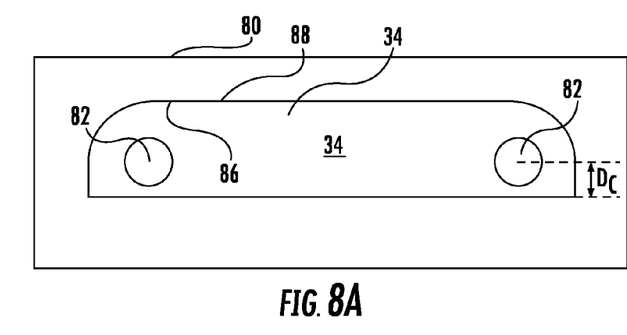
FIGS. 8A-8D illustrate a comparison of the molding processes of the coupler of FIGS. 2A-2D and the unitary component of FIGS. 6A-6C, and cross sectional views thereof.
Figure 8B:
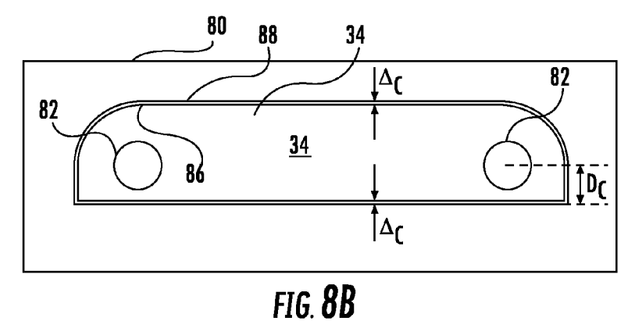

In this regard, FIGS. 8A-8D illustrate a comparison of the molding processes of the coupler 34 of FIGS. 2A-2D and the unitary component 64 of FIGS. 6A-6C, and cross sectional views thereof. For example, FIG. 8A illustrates the initial disposition of moldable material into a mold 80 to form coupler 34, described above with respect to FIGS. 2A-2D. Alignment-pin forming cores 82 define the alignment holes 36 of coupler 34, while an external surface 86 of the coupler 34 is defined by inner mold surface 88. However, as shown by FIG. 8B, as the moldable material cures, the coupler 34 shrinks within the mold 80, pulling the external surface 86 of the coupler 34 away from the inner mold surface 88 a distance $\Delta_C$. Thus, if the external surface 86 is used as a mounting surface for mounting the coupler 34 on a waveguide assembly, such as waveguide assembly 44, distance $\Delta_C$ (shown in FIG. 9C below) must be maintained within tolerances that allow for accurate alignment of an attached waveguide with a fiber optic connector.

Figure 8C:
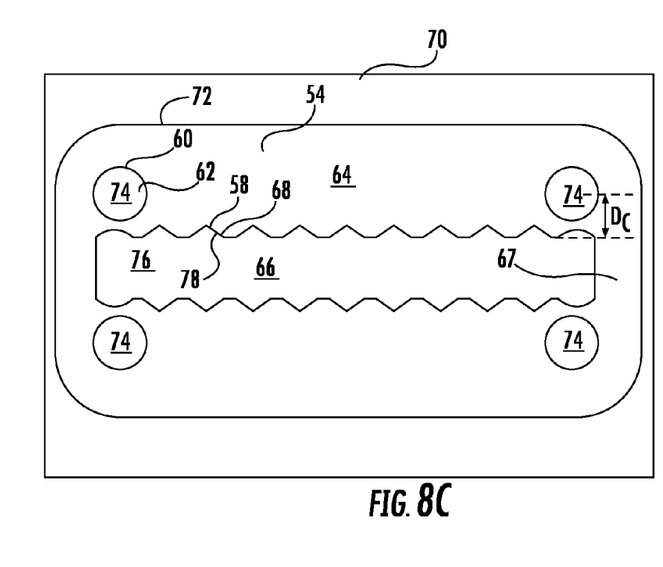
Figure 8D:
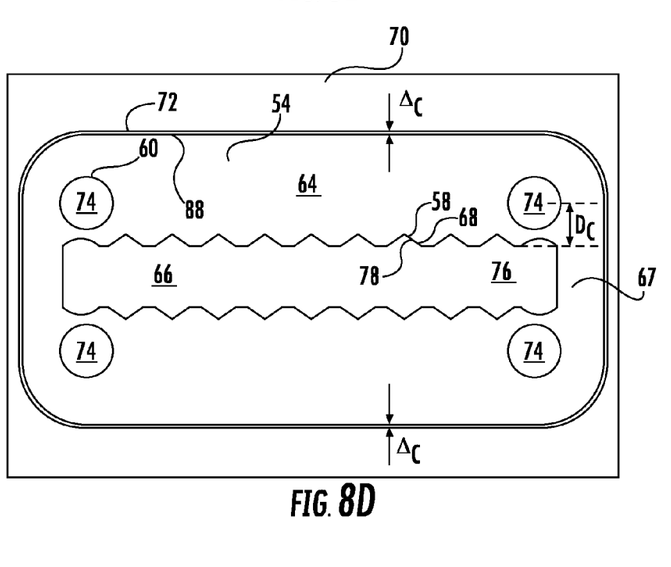

On the other hand, as also shown in FIGS. 8C and 8D, a vertical distance $D_C$ between the internal recess surface 68 of the recess 66 and the center axis of alignment holes 62 remains constant during curing of the unitary component 64. Thus, when the portion 67 of the unitary component 64 is removed, the resultant coupler 54 has a vertical distance $D_C$ between the external mounting surface 58 and the center axis of alignment holes 62 that is accurate and consistent, such that alignment of an attached waveguide with a fiber optic connector is likewise more accurate and consistent.

In some embodiments, a vertical distance $D_C$ between the alignment holes 62 and the external mounting surface 58 of the coupler 54 undergoes no reduction or substantially no reduction during curing. In other embodiments, a vertical distance $D_C$ between the alignment holes 62 and the external mounting surface 58 of the coupler 54 is reduced by less than one micron (1μ), and may be less than five hundred nanometers (500 nm) during curing.

Figure 9A:
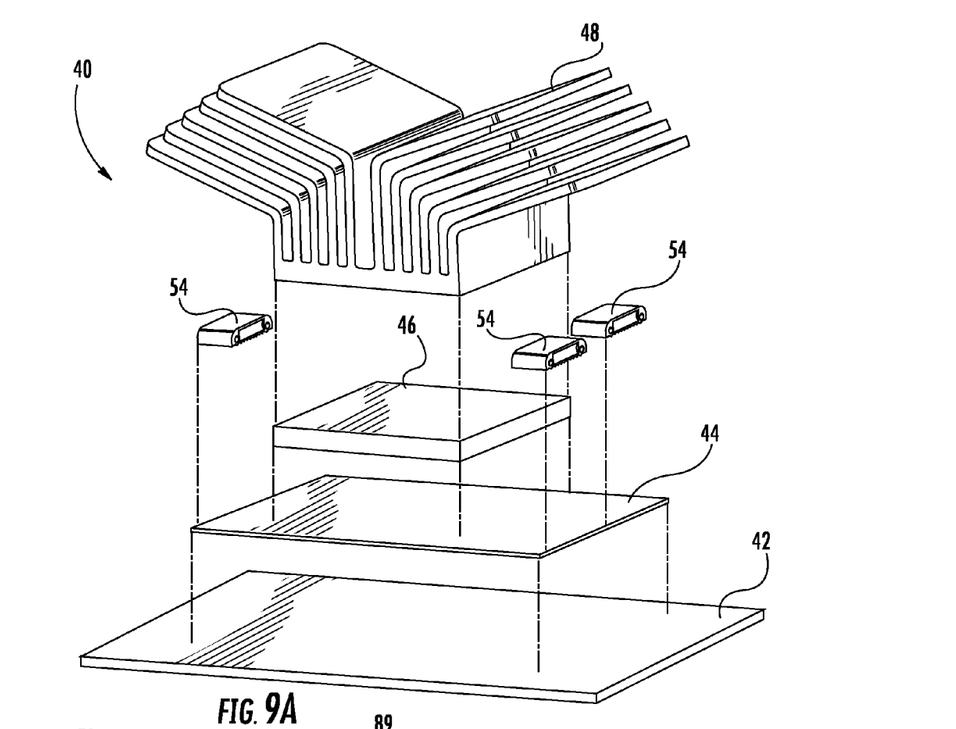
FIG. 9A-9C illustrate assembly of the board assembly of FIG. 3, including mounting the ferrules of FIGS. 3-4B to the board assembly.
Figure 9B:
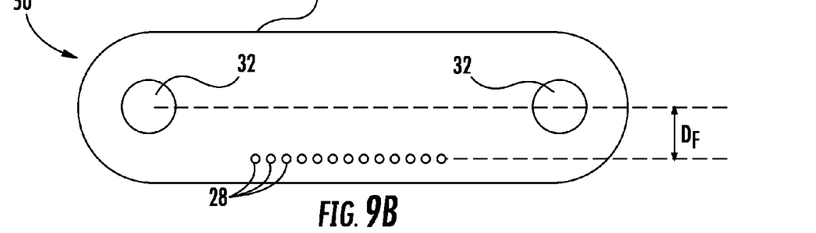
Figure 9C:
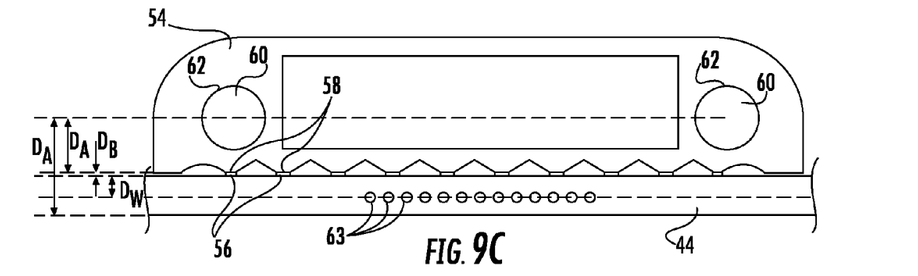

FIGS. 9A-9C illustrate assembly of the board assembly 40 of FIG. 3, including mounting the couplers 54 of FIGS. 3-4B to the board assembly 40, and cross sectional detailed views of connector ferrule 50 and edge-mounted coupler 54. Waveguide assembly 44 is mounted on substrate 42. Processor 46 is communicatively mounted on the waveguide assembly 44, and a heatsink 48 is mounted over the processor 46 to dissipate heat produced by the processor 46. Each ferrule-like side-facet coupler 54 is bonded to the waveguide assembly 44 such that the distance between the alignment holes 62 of the coupler 54 and the side-facets 63 of the waveguide assembly 44 is consistent and accurate (see FIG. 4B), thereby permitting accurate alignment of the optical fibers a fiber optic connector with the waveguide assembly 44.

FIGS. 10A-10D illustrate an exemplary connector ferrule 89 having a retaining clip 90 for retaining a pair of pins 91 in a fiber optic connector and for securing the connector to the ferrule 89 of the connector 50 according to FIG. 3 over a series of mate-demate cycles. In this embodiment, the clip 90 has two functions that complement each other. First, the clip 90 is configured to removably secure the connector 50 to the coupler 54, such that the optical fibers in the connector 50 are securely held in optical alignment with the side-facets 63 of waveguide assembly 44. The clip 90 is also configured to secure the alignment pins 91 within connector 50.

Figure 10A:
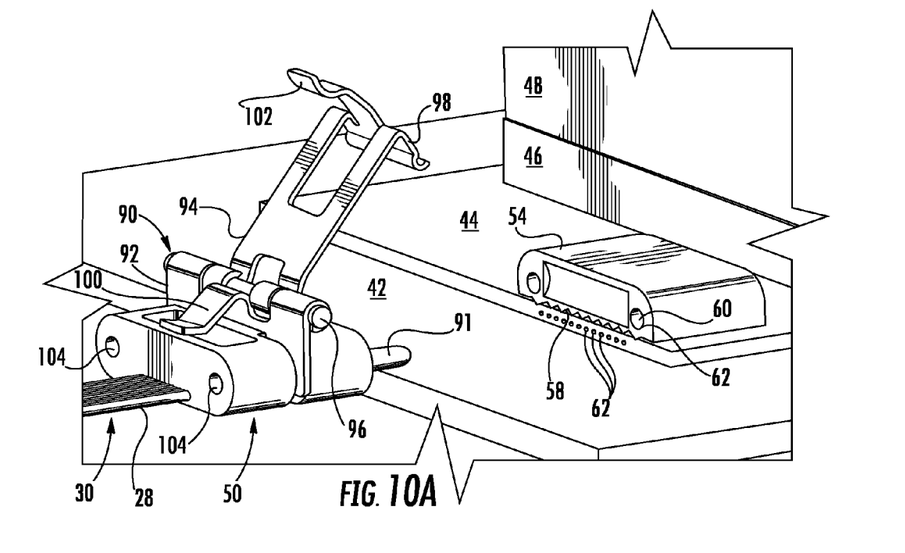
FIGS. 10A-10D illustrate an exemplary retaining clip for retaining a pair of pins in a fiber optic connector and for securing the connector to a ferrule according to FIG. 3, and assembly thereof.
Figure 10B:
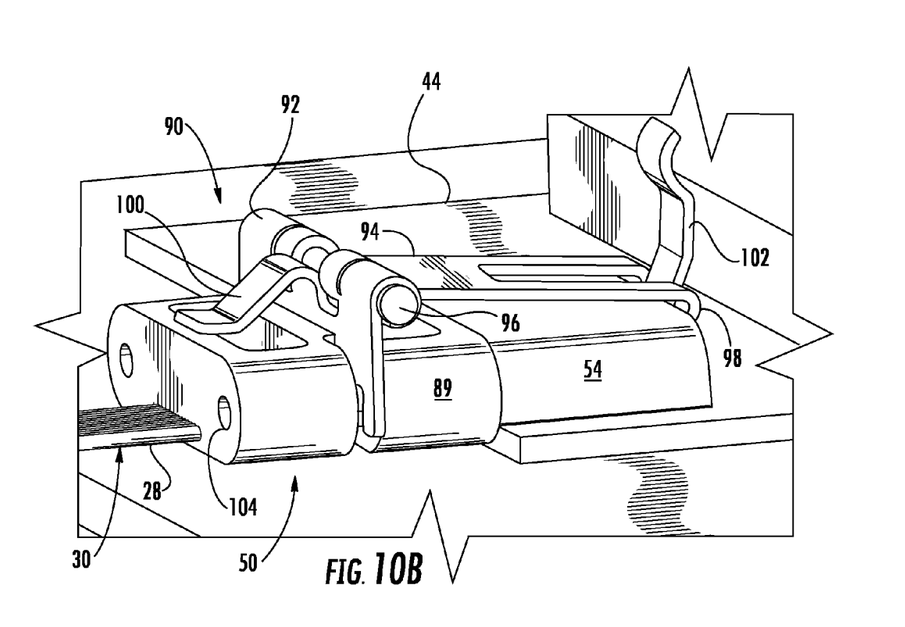

The clip 90 comprises a clip body 92 that secures the clip 90 to the connector 50 and also secures the pins 91 within the connector 50. An arm 94 is pivotally connected to the clip body 92 via a pin 96. A biasing member 98 extends from the arm 94 such that, when the connector 50 is connected to the coupler 54, the arm 94 and biasing member 98 may be rotated down and around the coupler 54. As shown in FIG. 10B, the biasing member 98 presses against the coupler 54 and causes the clip body 92 to press against the connector 50, thereby compressively retaining the connector 50 to the coupler 54 and waveguide assembly 44. A finger 100 extends from the clip body 92 to brace the clip 90 against the connector 50. A tab 102 also extends from the biasing member 98 to aid manual engagement and disengagement of the clip 90.

Figure 10C:
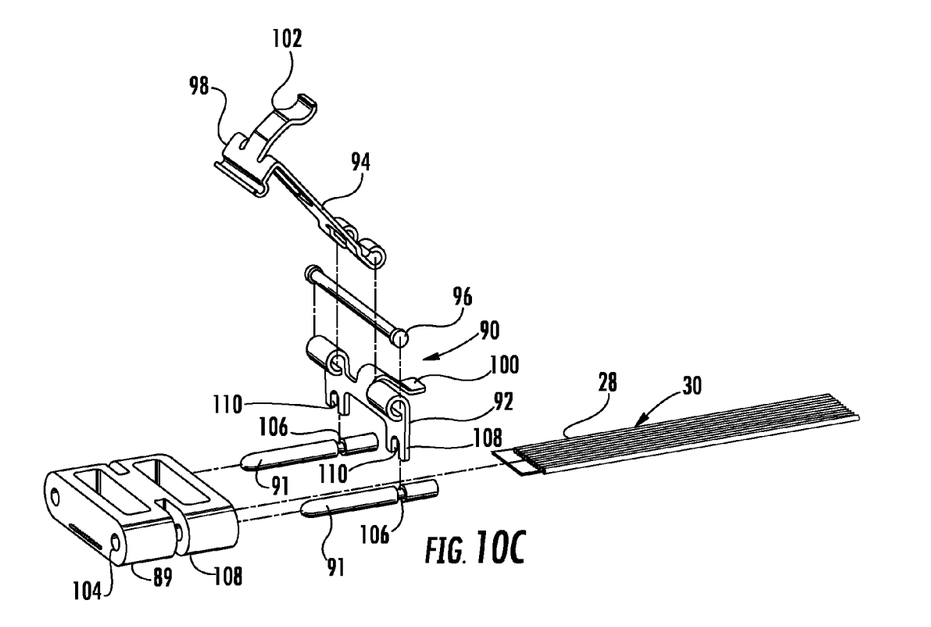
Figure 10D:
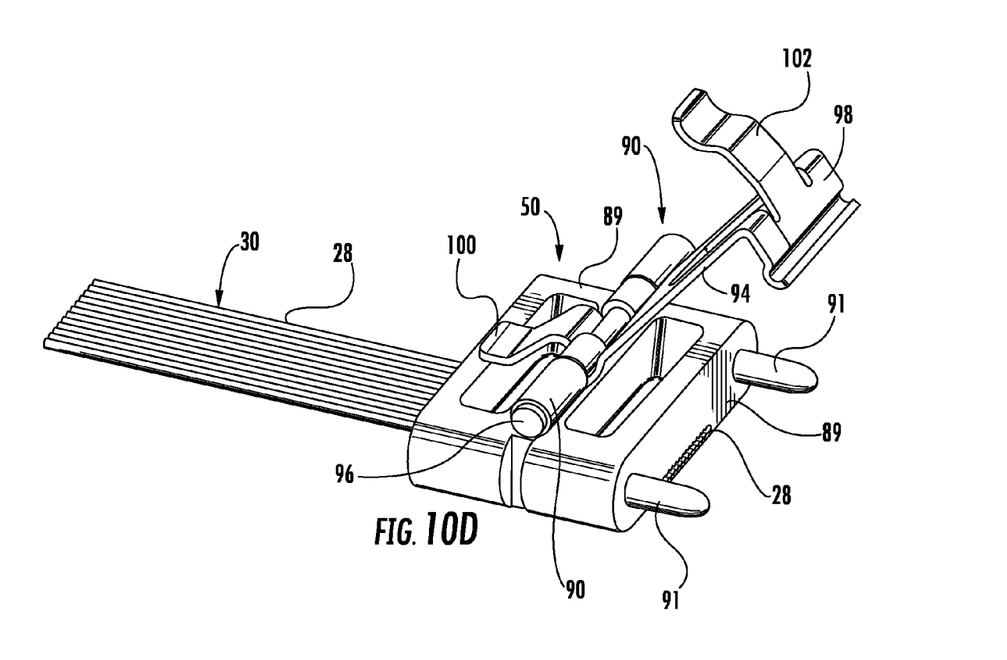

The retaining clip 90 is also used to retain the alignment pins 91 within alignment holes 104 of the connector ferrule 89 of the connector 50. Referring now to FIGS. 10C and 10D, alignment pins 91 may be separately formed from a more rigid material, such as metal, than the connector ferrule 89, which may be formed from thermoplastic, for example, as described above. In this embodiment, the pins 91 are inserted through holes 104 such that a groove 106 in each pin 91 is aligned with a respective ferrule slot 108 in the ferrule 89. The clip body 92 is then inserted into the ferrule slot 108 of the ferrule such that engagement slots 110 of the clip body engage grooves 106 of the pins 91, thereby retaining the pins 91 in the connector 50.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the specification. Since modifications combinations, sub-combinations and variations of the disclosed embodiments incorporating the spirit and substance of the specification may occur to persons skilled in the art, the specification should be construed to include everything within the scope of the appended claims and their equivalents.

What is claimed is:

1. A method of forming a side-facet coupler for receiving a connection feature of an edge-mount fiber optic connector comprising:
    disposing a moldable material in a side-facet coupler mold such that the moldable material is disposed around at least one core structure, thereby forming a unitary component having one or more connection features and one or more recesses each having at least one internal recess surface; and
    removing a portion of the moldable material from the unitary component such that a remaining portion of the moldable material of the unitary component forms one or more side-facet couplers each having:
        at least one of the one or more connection features for receiving a complementary connection feature of a fiber optic connector; and
        at least one external mounting surface formed from a portion of the at least one internal recess surface of the one or more recesses of the unitary component, the at least one external mounting surface configured to attach to a surface of a waveguide assembly for optically aligning one or more optical fibers in a fiber optic connector with a waveguide disposed in the waveguide assembly when the connection feature of the fiber optic connector is connected to the at least one of the one or more connection features of the side-facet coupler.

2. The method of claim 1, wherein removing the portion of the moldable material from the unitary component forms at least two side-facet couplers.

3. The method of claim 1, wherein the at least one of the one or more connection features of each side-facet coupler comprises at least one recess configured to receive the connection feature of the fiber optic connector.

4. The method of claim 1, wherein at least one alignment feature of the coupler defines a first connection plane, and the external mounting surface defines a second connection plane offset from the first connection plane.

5. The method of claim 1, wherein the moldable material is thermoplastic; and
    for each coupler, a distance between at least one coupler connection feature and the at least one external mounting surface of the coupler undergoes substantially no reduction during curing.

6. The method of claim 1, wherein the moldable material is thermoplastic; and
    for each coupler, a distance between the at least one coupler connection feature and the at least one external mounting surface of the coupler is reduced by less than one micron ($1\mu$) during curing.

7. The method of claim 1, wherein the at least one external mounting surface comprises a plurality of longitudinal contact surfaces configured to bond with the surface of the waveguide assembly.

8. The method of claim 7, wherein at least a portion of the at least one external mounting surface has a sawtooth-shaped cross-sectional profile.

9. A method of forming a side-facet coupler for receiving a connection feature of an edge-mount fiber optic connector comprising:
    disposing a moldable material in a side-facet coupler mold such that the moldable material is disposed around at least one core structure, thereby forming a unitary component having one or more connection features and one or more recesses each having at least one internal recess surface; and
    removing a portion of the moldable material from the unitary component such that a remaining portion of the moldable material of the unitary component forms one or more side-facet couplers each having:
        at least one of the one or more connection features for receiving a complementary connection feature of a fiber optic connector; and
        at least one external mounting surface formed from a portion of the at least one internal recess surface of the one or more recesses of the unitary component, the at least one external mounting surface configured to attach to a surface of a waveguide assembly for optically aligning one or more optical fibers in a fiber optic connector with a waveguide disposed in the waveguide assembly when the connection feature of the fiber optic connector is connected to the at least one of the one or more connection features of the side-facet coupler, wherein at least one alignment feature of the coupler defines a first connection plane, and the external mounting surface defines a second connection plane offset from the first connection plane.

10. The method of claim 9, wherein removing the portion of the moldable material from the unitary component forms at least two side-facet couplers.

11. The method of claim 9, wherein the at least one of the one or more connection features of each side-facet coupler comprises at least one recess configured to receive the connection feature of the fiber optic connector.

12. The method of claim 9, wherein at least one alignment feature of the coupler defines a first connection plane, and the external mounting surface defines a second connection plane offset from the first connection plane.

13. The method of claim 9, wherein the moldable material is thermoplastic; and
    for each coupler, a distance between at least one coupler connection feature and the at least one external mounting surface of the coupler undergoes substantially no reduction during curing.

14. The method of claim 9, wherein the moldable material is thermoplastic; and
    for each coupler, a distance between the at least one coupler connection feature and the at least one external mounting surface of the coupler is reduced by less than one micron ($1\mu$) during curing.

15. The method of claim 9, wherein the at least one external mounting surface comprises a plurality of longitudinal contact surfaces configured to bond with the surface of the waveguide assembly.

16. The method of claim 15, wherein at least a portion of the at least one external mounting surface has a sawtooth-shaped cross-sectional profile.

17. A method of forming a side-facet coupler for receiving a connection feature of an edge-mount fiber optic connector comprising:
 disposing a moldable material in a side-facet coupler mold such that the moldable material is disposed around at least one core structure, thereby forming a unitary component having one or more connection features and one or more recesses each having at least one internal recess surface; and
 removing a portion of the moldable material from the unitary component such that a remaining portion of the moldable material of the unitary component forms one or more side-facet couplers each having:
  at least one of the one or more connection features for receiving a complementary connection feature of a fiber optic connector; and
  at least one external mounting surface formed from a portion of the at least one internal recess surface of the one or more recesses of the unitary component, the at least one external mounting surface configured to attach to a surface of a waveguide assembly for optically aligning one or more optical fibers in a fiber optic connector with a waveguide disposed in the waveguide assembly when the connection feature of the fiber optic connector is connected to the at least one of the one or more connection features of the side-facet coupler, wherein the at least one external mounting surface comprises a plurality of longitudinal contact surfaces configured to bond with the surface of the waveguide assembly.

18. The method of claim 17, wherein removing the portion of the moldable material from the unitary component forms at least two side-facet couplers.

19. The method of claim 17, wherein the at least one of the one or more connection features of each side-facet coupler comprises at least one recess configured to receive the connection feature of the fiber optic connector.

20. The method of claim 17, wherein at least one alignment feature of the coupler defines a first connection plane, and the external mounting surface defines a second connection plane offset from the first connection plane.

21. The method of claim 17, wherein at least a portion of the at least one external mounting surface has a sawtooth-shaped cross-sectional profile.

* * * * *